UNITED STATES PATENT OFFICE.

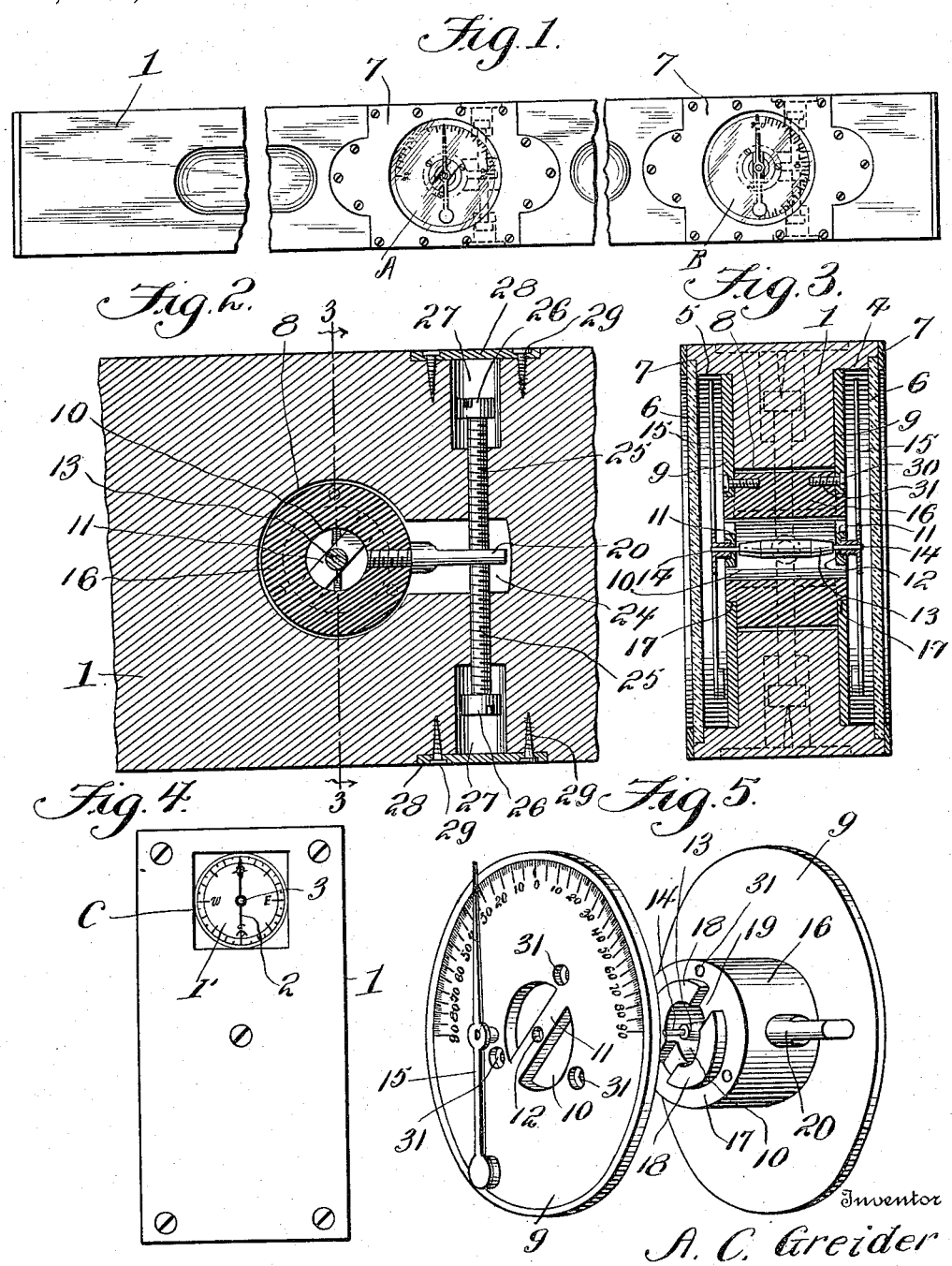

AMOS C. GREIDER, OF NORTH WEBSTER, INDIANA, ASSIGNOR OF ONE-HALF TO JOHN ANGEL, OF NORTH WEBSTER, INDIANA.

PLUMB AND LEVEL GAGE.

1,165,246.  Specification of Letters Patent. Patented Dec. 21, 1915.

Application filed March 20, 1915. Serial No. 15,816.

*To all whom it may concern:*

Be it known that I, AMOS C. GREIDER, citizen of the United States, residing at North Webster, in the county of Kosciusko and State of Indiana, have invented new and useful Improvements in Plumb and Level Gages, of which the following is a specification.

This invention relates to plumb and level gages, the object in view being to produce a simple, effective and accurately adjustable device of the class described for indicating in degrees or like measurements whether or not a certain surface is level or horizontal, or vertical and if not, the number of degrees which said surface varies from the horizontal or vertical.

One of the main objects of the present invention is to produce a gravity operated plumb and level indicator visible from both sides of the stock or body of the implement, combined with means for accurately adjusting the indicating dials and also supporting the spindle on which the indicating pointers are mounted.

With the above and other objects in view, the invention consists in the novel construction, combination and arrangement of parts, as herein described, illustrated and claimed.

In the accompanying drawings:—Figure 1 is a plan view of one side of a plumb and level indicator embodying the present invention, showing both the horizontal and vertical pointers. Fig. 2 is an enlarged fragmentary section through the device taken at right angles to the spindle of the pointers, showing the manner of adjusting the graduated dials and their yoke. Fig. 3 is a cross section on the line 3—3 of Fig. 2. Fig. 4 is an end view of the body or stock showing the end inclinometer. Fig. 5 is an enlarged perspective view illustrating the two dials, the interlocking yoke and one of the indicating pointers.

Referring to the drawings 1 designates the body or stock of the device which resembles the body of an ordinary spirit level. This body or stock may be of any desired dimensions in all directions. The body 1 is shown as provided with a level indicator designated generally at A, a plumb indicator designated generally at B and an end inclinometer designated generally at C and being located in either or both ends of the body 1, said inclinometer comprising a graduated dial or face 1' and a gravity controlled indicating pointer 2 centrally supported pivotally at 3.

As shown in Fig. 3, at the place where each of the indicators A and B occurs, the body 1 is formed in the opposite sides thereof with recesses 4 and 5 preferably circular in formation and covered by transparent panels 6 of glass or its equivalent, said panels being held in place by marginal retainers or rings 7.

8 represents an opening intersecting and connecting the recesses 4 and 5 as shown in Fig. 3, said opening being preferably cylindrical or round in cross section as indicated in Fig. 2.

In each of the recesses 4 and 5 there is arranged a graduated dial 9 the graduations running from zero to ninety in both directions from the center as best illustrated in Fig. 5. Each of said dials is formed with a central opening crossed by a diametrical key 11 which key is centrally formed with a bearing opening 12 for one end of a spindle 13, said spindle having reduced extremities 14 on which are mounted a pair of indicating pointers or hands 15 adapted to sweep around the peripheries of the dials 9.

Between the two disks 9 there is a yoke 16 shown in the form of a cylinder having its opposite ends rabbeted as shown at 17 and also formed with a diametrical slot at each end dividing the projecting reduced portion at each end of the yoke into a pair of segmental projections 18 which are inserted in the openings 10 of the dials 9 at opposite sides of the diametrical key 11, said key fitting in the notches 19 formed by the diametrical slot cut through the reduced end portion of the yoke. The construction just referred to and clearly shown in Fig. 5 is true of both ends of the yoke 16, said yoke bearing the same relation to both dials 9. Therefore both of the dials and the yoke have an interlocked or keyed connection with each other so that when one is turned all of said elements are equally and simultaneously turned.

Extending outwardly from the periphery of the yoke 16 is an arm 20 which as shown in Fig. 3 is movable in a recess 24 in the body or stock 1. The extremities of a pair of adjusting screws 25 bear against opposite sides of the arm 20 as shown in Fig. 2 for the purpose of moving said arm 20 to one side or the other thereby accurately setting the dials 9. The screws 25 are threaded in the body or stock 1 and provided with the usual heads 26 arranged in recesses 27 formed in the body 1 which recesses are normally closed by face plates 28 secured to the body 1 by fasteners 29. If desired, screws or like fasteners 30 may be inserted through the holes 31 in the dials into the opposite ends of the yoke 16 to prevent the dials 9 from becoming disengaged from the ends of the yoke.

From the foregoing description, taken in connection with the accompanying drawings, it will now be understood that by loosening one of the screws 25 and correspondingly tightening the other screw 25, the arm 20 may be moved, thereby partially turning the yoke until the graduated dials 9 register at zero with the pointers 15 when the body 1 is resting on a perfectly horizontal surface in one case and resting against a perfectly vertical surface in the other case. This greatly increases the accuracy of the device and confidence of the mechanic therein without adding materially to the original cost and upkeep of the instrument.

What I claim is:—

1. In a device of the class described, a body having recesses in the opposite sides thereof and formed with an opening intersecting both recesses, dials arranged in said recesses, a yoke connecting said dials in such manner that both of the dials and said yoke have a fixed relation to each other, an arm extending from said yoke in fixed relation thereto, means carried by the body for adjusting said arm to turn said dials and yoke, a spindle passing through said yoke, and indicating pointers on the opposite extremities of said spindle.

2. In a device of the class described, a body having recesses in the opposite sides thereof and formed with an opening intersecting both recesses, dials arranged in said recesses, a yoke connecting said dials in such manner that both of the dials and said yoke have a fixed relation to each other, an arm extending from said yoke in fixed relation thereto, means carried by the body for adjusting said arm to turn said dials and yoke, a spindle passing through said yoke and journaled in said dials, and indicating pointers on the opposite extremities of said spindle.

3. In a device of the class described, a body having recesses in the opposite sides thereof and formed with an opening intersecting both recesses, dials arranged in said recesses, a yoke connecting said dials in such manner that both dials and said yoke have a fixed relation to each other, said yoke and dials having interfitting keys and keyways, an arm extending from said yoke in fixed relation thereto, means carried by the body for adjusting said arm to turn said dials and yoke, a spindle passing through said yoke, and indicating pointers on the opposite extremities of said spindle.

In testimony whereof I affix my signature in presence of two witnesses.

AMOS C. GREIDER.

Witnesses:
WILLIAM MILLER,
O. F. GERARD.

Copies of this patent may be obtained for five cents each, by addressing the "Commissioner of Patents, Washington, D. C."